(No Model.)

H. T. WHEELER.
CUTTING AND DRAINING BOARD.

No. 454,552. Patented June 23, 1891.

Witnesses.
Myrtie C. Beals.
George Weller.

Inventor.
Henry T. Wheeler,
By Albert M. Moore,
His Attorney.

UNITED STATES PATENT OFFICE.

HENRY T. WHEELER, OF LOWELL, MASSACHUSETTS.

CUTTING AND DRAINING BOARD.

SPECIFICATION forming part of Letters Patent No. 454,552, dated June 23, 1891.

Application filed April 9, 1891. Serial No. 388,239. (No model.)

*To all whom it may concern:*

Be it known that I, HENRY T. WHEELER, a citizen of the United States, residing at Lowell, in the county of Middlesex and Commonwealth of Massachusetts, have invented a certain new and useful Improvement in Cutting and Draining Boards, of which the following is a specification.

My invention relates to cutting and draining boards of that class which are adapted to support meat while being cut or sliced and to drain away the blood and juices which run from the meat while being cut; and it consists in the devices and combinations hereinafter described and claimed.

Figure 1:
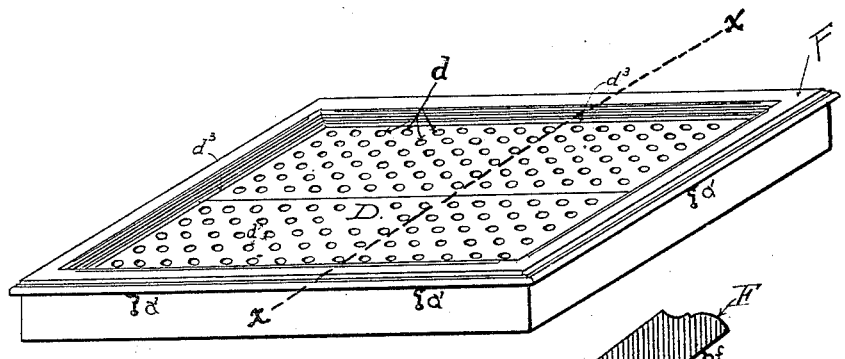
Figure 2:
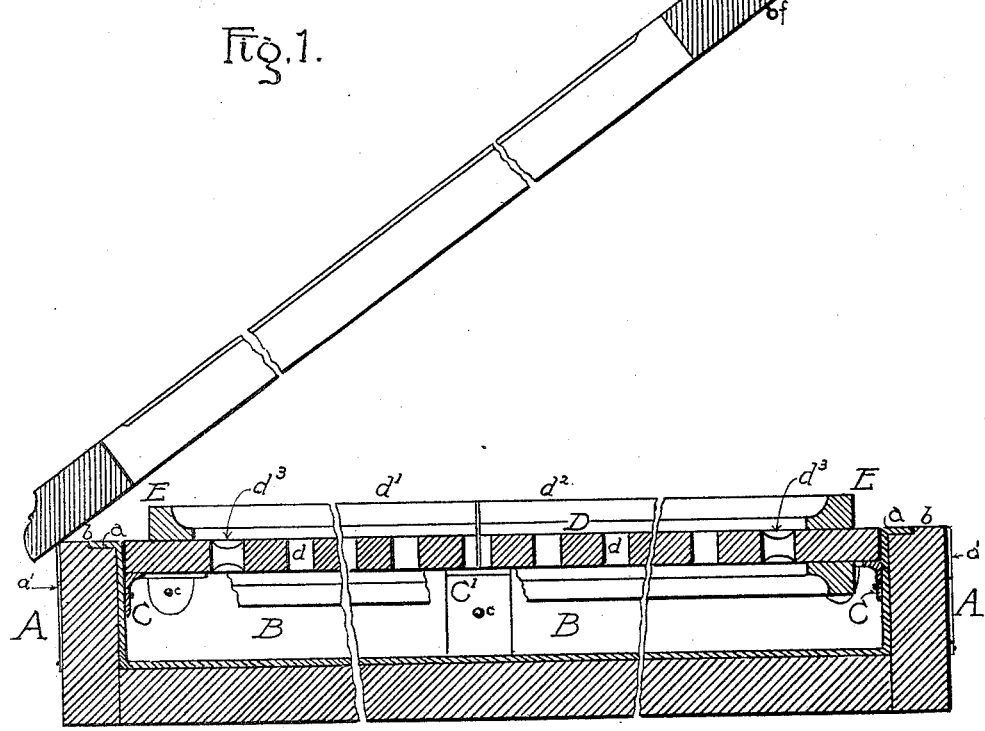

In the accompanying drawings, Figure 1 is an isometric perspective view of a cutting and draining board constructed according to my invention; and Fig. 2, a vertical cross-section of the same in line $x$ $x$, Fig. 1.

It is a common practice in retail meat-shops to allow meat to lie on the block or bench on which it is cut, not only during the cutting of it, but from one cutting until the other and until the meat is all sold. In the case of some meats, notably liver, the blood runs from the meat when it is cut and befouls the supporting bench or block and drips therefrom, presenting a filthy and disgusting sight and making it difficult to keep the bench and the floor in its vicinity approximately clean.

The object of the invention herein described is to keep the cutting-table as clean as possible and to remove the blood and juices from the meat out of sight immediately.

A is a box, as of wood, rectangular, preferably, and having a metallic lining or drip-pan B, as of sheet-zinc. The upper edges of the pan B are turned outward and rest upon the top of the sides of the box A, and may be let in flush with said top, as shown in Fig. 2 at $b$, the top of the box being rabbeted, as at $a$, for that purpose.

To the inside of the drip-pan B are secured brackets C by solder or by rivets $c$, or by both, to support the cutting-board proper or table D with its upper surface flush with the top of said box A and pan B.

The table D is preferably of wood of any kind not very liable to warp, and is provided with numerous small perforations $d$ to allow the blood and juices from liver or other meat placed on said table to run through said table into the drip-pan B. The table D, if large, may be made in two or more parts $d'$ $d^2$ for cheapness and convenience in handling and rests upon the brackets C, the brackets C', where the parts $d'$ $d^2$ of the table meet, being of a greater width to reach under both of said parts. A ledge or strip E, preferably a wooden molding, is secured to the table near to and parallel with the edges thereof to prevent the blood from the meat running over said edges, and just within said ledge is cut a continuous groove or channel $d^3$ to catch said blood and conduct the same to such of the perforations $d$ as are in said groove $d^3$. To enable the table D to be used either side up, so that when one side is worn and splintered the other may be used, it may, as shown in Fig. 2, be provided with a groove $d^3$ and ledge E. The table D, when in use, is retained in position by a rectangular frame or holder F, which rests upon the table outside of said ledge E and upon the top of the drip-pan B and box A, and is retained in place by any convenient means, as by hooks $a'$, pivoted on the sides of said box and engaging screw-eyes $f$, secured in said holder.

To improve the appearance of the device and to cause any blood that may accidentally get on the holder F from running down on the sides of the box A, said holder, which preferably is made of wooden molding, overhangs or extends beyond said sides.

As above stated, the cutting and draining board herein described is especially useful for the display and cutting up of liver, because by the use of said board the liver, which, except in the hottest weather, is liable to be exposed, without ice, for two or three days before it is all sold, is kept clean in appearance and in reality, instead of resting in a pool of blood, which soon becomes putrid, causing the liver frequently to sour and partially decompose. Liver is very difficult to keep sweet, and the use of said cutting and draining board will therefore be advantageous to dealers in meat by preventing a loss of liver and to customers, who prefer clean and wholesome food.

I claim as my invention—

1. The combination of a drip-pan and a table provided with perforations and with a groove in which some of said perforations lie, as and for the purpose specified.

2. The combination of a drip-pan and a table provided with perforations and with a continuous groove, within the outer edge of which groove all of said perforations lie, as and for the purpose specified.

3. The combination of a drip-pan, a table provided with perforations, and a ledge secured to said table around said perforations, as and for the purpose specified.

4. The combination of a drip-pan and a table provided with perforations and with a continuous groove, within the outer edge of which groove all said perforations lie, and a ledge secured to said table around said groove, as and for the purpose specified.

5. The combination of the drip-pan, a table provided with perforations and with a continuous groove, within the outer edge of which groove all said perforations lie, a ledge secured to said table around said groove, and a holder arranged to rest upon said table outside of said ledge to retain said table in said pan, as and for the purpose specified.

6. The combination of a box, a drip-pan arranged in said box, brackets secured to the inside of said drip-pan below its top, a perforated table arranged within said drip-pan and supported upon said brackets, a ledge surrounding the perforations of said table, and a holder arranged upon said table outside of said ledge and having eyes and hooks arranged upon said box and adapted to engage said eyes to retain said holder and table in position, as and for the purpose specified.

In witness whereof I have signed this specification, in the presence of two attesting witnesses, this 1st day of April, A. D. 1891.

HENRY T. WHEELER.

Witnesses:
ALBERT M. MOORE,
MYRTIE C. BEALS.